United States Patent
Ishihara

[11] Patent Number: 5,946,100
[45] Date of Patent: *Aug. 31, 1999

[54] THREE-DIMENSIONAL SHAPE MEASURING APPARATUS

[75] Inventor: Mitsuhiro Ishihara, Aichi-ken, Japan

[73] Assignee: Takaoka Electric Mfg. Co., Ltd., Tokyo, Japan

[*] Notice: This patent is subject to a terminal disclaimer.

[21] Appl. No.: 08/959,491

[22] Filed: Oct. 28, 1997

Related U.S. Application Data

[62] Division of application No. 08/721,051, Sep. 26, 1996, Pat. No. 5,737,084.

[30] Foreign Application Priority Data

| Sep. 29, 1995 | [JP] | Japan | 7-275060 |
| Nov. 2, 1995 | [JP] | Japan | 7-308587 |
| Mar. 26, 1996 | [JP] | Japan | 8-94682 |

[51] Int. Cl.⁶ .................................................. G01B 11/24
[52] U.S. Cl. ............................................................ 356/376
[58] Field of Search ..................................... 356/376, 375; 359/821

[56] References Cited

U.S. PATENT DOCUMENTS 5,687,031  11/1997  Ishihara .

FOREIGN PATENT DOCUMENTS 7-181023  7/1995  Japan .

*Primary Examiner*—Robert H. Kim
*Assistant Examiner*—Amanda Merlino
*Attorney, Agent, or Firm*—Oblon, Spivak, McClelland, Maier & Neustadt, P.C.

[57] ABSTRACT

A three-dimensional shape measuring apparatus which has an improved arrayed confocal imaging system.

A three-dimensional shape measuring apparatus using a confocal imaging system which has a new means for changing the distance in the Z direction between the object and the object-position-in-focus, instead of an object stage moved in the Z direction. This means shifts the object-position-in-focus in the Z direction by refraction. One means inserts a plurality of transparent flat plates between the objective lens and the object-position-in-focus in turn. Another means uses a transparent flat plate made of a material for which the refractive index changes according to the voltage applied and is disposed between the object and the object-position-in-focus. A three-dimensional shape measuring apparatus using a confocal imaging system wherein an image processor estimates the position from which the intensity of the reflected light for each pixel of the confocal image becomes maximum by interpolation of a value from the curve of the relationship between the intensity of light detected and the distance from the object-position-in-focus to an object point.

4 Claims, 11 Drawing Sheets

THREE-DIMENSIONAL SHAPE MEASURING APPARATUS

This is a Division of application Ser. No. 08/721,051 filed on Sep. 26, 1996, now U.S. Pat. No. 5,737,084.

BACKGROUND OF THE INVENTION

1. Field of the Invention

The present invention relates to a three-dimensional shape measuring apparatus, and particularly to a three-dimensional shape measuring apparatus using a confocal imaging system.

2. Discussion of the Background

A three-dimensional shape measuring apparatus using a confocal imaging system is used for automatic inspections of minute products on production lines.

The basic configuration of the confocal imaging system is shown in FIG. 1. Light emitted from a pinhole 1 passes through a half mirror 2. The light from the half mirror 2 is then converged by an objective lens 3 toward an object. The light which strikes the surface of the object is reflected. Of the reflected light, the light which enters the objective lens 3 is caused to converge by the objective lens 3, and is then deflected by the half mirror 2 toward the pinhole 4 which is disposed at the same position optically as the pinhole 1. The quantity (intensity) of the light passing through the pinhole 4 is measured by a detector 5. This is the basic configuration of the confocal imaging system. The position of a point on the surface of an object in the Z direction (the direction of the optical axis of the objective lens 3) can be measured using this confocal imaging system as follows.

When a point P on the surface of an object is at a position where the light converges, the light reflected from the point P is focused on the pinhole 1 if the half mirror 2 does not exist. The reflected light deflected by the half mirror 2 therefore converges on the pinhole 4 which is located at the same position optically as the pinhole 1, and most of this light passes through the pinhole 4. However, as the point P moves away from the converging position of the illuminating light in the direction of the optical axis of the objective lens 3 (the Z direction), the position at which the reflected light converges also shifts away from the pinhole 4 and the amount of light which passes through the pinhole 4 abruptly decreases.

Therefore, the height of the point P on the surface of the object can be calculated by measuring the intensity of the reflected light which passes through the pinhole 4 using the detector 5 at differing distances while changing the distance between the object and the objective lens 3 by moving the object stage in the Z direction (or by moving the confocal imaging system), and then by determining the position where the intensity of the reflected light reaches the maximum. The position of an object point at which the intensity of the light reflected from that point becomes maximum is herein called the object-position-in-focus. As described above, the object-position-in-focus is the same position as the converging position of the light.

Further, a three-dimensional shape of an object can be measured by moving the object stage in the direction at right angles to the optical axis of the objective lens 3 (XY direction) to position points on the surface of the object on the optical axis in turn and repeating the above Z-position measurement. This method, however, requires moving the object stage in the Z direction for each of a large number of points to be measured, and therefore takes a long time for measurement.

For this reason, instead of moving the object stage in the Z direction for each point to be measured on the surface of the object, the three-dimensional shape is measured by moving the object stage stepwise in the Z direction and in the XY direction so that the object is scanned by the optical axis of the objective lens 3 at each stop position of the object stage, sampling the intensity of the reflected light to obtain a two-dimensional image corresponding to the intensity of the light reflected from each measuring point on the surface of the object (this two-dimensional image is called a confocal image), and finding a confocal image for each pixel in which the intensity of light of the pixel is maximum among the thus-obtained confocal images. Accordingly, the height of the point on the surface of the object corresponding to the pixel from the Z position of the confocal image can be calculated. In this method, the object stage has to be moved in the Z direction only once, and therefore the measuring speed is improved in comparison with the above described method which is more faithful to the principle of measurement of the three-dimensional shape of an object.

However, since scanning in the XY direction by moving the object stage in the XY direction takes a long time, a method for scanning a laser beam using a light-deflecting means such as an AO element, an EO element, a galvano-mirror, or a polygon mirror, and scanning by rotating at high speed a disk (Nipkow disk) containing a number of pinholes spirally arranged, is used to further increase the measuring speed. The apparatus using these scanning methods is called a three-dimensional shape measuring apparatus using a scanning confocal imaging system. This type of apparatus has the following problems. Since the apparatus cannot simultaneously detect the reflected light from all points for measuring an object, the Z positions for various points gradually shift, one after another, by a small distance if acquisition of a confocal image is performed continuously moving the object stage in the Z direction. This slight shifting in the Z position causes errors. For this reason, the object stage must be moved by steps in the Z direction, and moving the object stage by steps takes a much longer time than moving it continuously. In addition, deviations in scanning and sampling timing cause errors in the XY positions of the measured points of a confocal image.

To acquire more accurate confocal images at a higher speed and to simplify the structure of the apparatus, Japanese Patent Applications Laid-open (JPA) No. 265918/1982 and No. 181023/1995 disclose three-dimensional shape measuring apparatuses which acquire confocal images without optical scanning by arranging confocal imaging systems in parallel (hereinafter referred to as an arrayed confocal imaging system).

The apparatus of JPA No. 265918/1982 is shown in FIG. 2, in which light emitted from a white-light source 6 is refracted into parallel light rays by a collimating lens 7 and directed onto a pinhole array 8. The pinhole array 8 consists of a large number of pinholes arranged on the same plane. Each pinhole of the pinhole array 8 can be regarded as a point light source, and therefore the pinhole array 8 is equivalent to an array of point light sources. The light which passes through the pinholes of the pinhole array 8 then passes through a half mirror 2, and the light emitted from the half mirror 2 is directed onto an object O by an objective lens 3 consisting of lenses 10 and 11 and a telecentric diaphragm 12 placed between the lenses 10 and 11. The reflected light from the object O is converged through the objective lens 3 and is deflected by the half mirror 2. It then enters a CCD sensor 9. This configuration is equivalent to a plurality of confocal imaging systems arranged in parallel. Although confocal imaging systems generally must be disposed apart from one another by a distance five to ten times the diameter of the pinhole in order to provide a plurality of confocal imaging systems in parallel, the size of this apparatus is reduced to a reasonable size by using pinholes of a very small diameter and thereby disposing the confocal imaging systems more close together. In addition, by using a CCD sensor with a small aperture ratio (i.e. the ratio of the size of the photoelectric elements of a CCD to the pixels is very small), this apparatus eliminates the use of pinholes which are necessary on the detection side in the conventional configuration.

Next, the apparatus disclosed in JPA No. 181023/1995 is shown in FIG. 3. The light source 6 of this apparatus is a laser beam source, and a beam expander 2 is used to obtain parallel light rays of a large diameter. The light emitted from the beam expander 2 enters an illuminating and detecting section 5. As shown in an enlarged drawing in FIG. 4, the illuminating and detecting section 5 consists of a mask 15 with a large array of circular holes, a reflex hologram 16 which reflects and diffracts incident light from below, a microlens array 17 which converges the light, a detector array 18, and a pinhole array 19. Of the parallel light rays incident on the illuminating and detecting section 5, only the light which passes through the holes of the mask 15 enters the hologram 16. The zeroth-order diffracted light of the hologram 16 enters the corresponding lens of the microlens array 17 and is converged by the lens to pass through the corresponding pinhole of the pinhole array 19. The light which passes through the pinholes of the pinhole array 19 is shone on an object O through an object lens 3 consisting of lenses 10 and 11 and a telecentric diaphragm 12 placed between the lenses 10 and 11. The reflected light from the object O again passes through the same pinhole of the pinhole array 19 as the illuminating light passes through and is refracted by the corresponding lens of the microlens array 17 into parallel light rays to reach the reflex hologram 16. Part of the light is reflected by the reflex hologram 16. Of this reflected light, the first-order diffracted light is converged by the corresponding lens of the microlens array 17 onto the corresponding detector of the detector array 18. This apparatus is compact as compared with the apparatus disclosed by JPA No. 265918/1992, because only one pinhole array 19 is used instead of the two pinhole arrays used in the JPA No. 265918/1992 (one at the illumination side for illuminating an object by point sources and the other at the detection side for detecting the reflected light from the object), the half mirror is eliminated, and the detection array 18 is disposed in almost the same plane as the pinhole array 19.

However, there are following problems with the above conventional three-dimensional shape measuring apparatuses with an arrayed confocal imaging system.

In the apparatus of JPA No. 265918/1992, individual photoelectric elements of the CCD sensor must perform the function of pinholes on the detection side. Therefore, the reflected light from a point on the object O to be measured at the object-position-in-focus must be made to converge accurately on the corresponding photoelectric element of the CCD sensor. For this purpose, the pinhole array 8, the objective lens 3, and the CCD sensor 9 must be in precise alignment, and very precise (submicron order) positioning is required. Further, the diameter and pitch of the pinholes of the pinhole array 8 must equal those (diameter about 2 $\mu$m and pitch about 10 $\mu$m) of the photoelectric element of the CCD sensor 9. In such a configuration, however, the rate at which the light passes through the pinholes (coefficient of utilization) decreases considerably, and it is difficult to obtain light with the intensity necessary for measurement. Although the microlenses are aligned coaxially with the pinholes, it is impossible in practice to converge light into a spot 2 $\mu$m in diameter by a microlens 10 $\mu$m in diameter, taking diffraction of light into account. Therefore, the diameter of the spot is relatively larger than that of the pinholes and it is difficult to sufficiently increase the coefficient of utilization of illuminating light.

On the other hand, the apparatus of JPA No. 181023/1995 uses one pinhole array as the illuminating pinhole array and the detecting pinhole array, and hence does not have the problem of alignment of the pinholes of the illuminating pinhole array and the photoelectric elements of a CCD as in the case of the apparatus in JPA No. 265918/1992. It also does not have the problem of inadequate intensity of illuminating light because the size of the microlenses can be determined independently of the CCD sensor. However, a large-scale facility is needed for manufacturing this apparatus because of its very complicated structure. Specifically, the same process technology as required for the manufacture of semiconductor devices is required for manufacturing the pinhole array, detector array, and circuits for reading out data from the integrated detectors, and a dedicated production line is needed. Another dedicated production facility is needed for laminating the reflex hologram and the microlens array, and then precisely aligning the microlens array with the pinhole array and joining them together. Moreover, laser light must be used for the reflex hologram to fulfill its function, but laser light is prone to interfere and is not suited for measurement of a three-dimensional shape. For example, if there is an unevenness of ¼ $\lambda$ (wavelength) in the area of a point on an object to be measured, the reflected light disappears because of interference. Therefore, measuring the height of such a point is impossible. Measurement in color is also impossible with laser light. Furthermore, this apparatus cannot separate illuminating light and reflected light by a dichroic mirror, a technique which is necessary for fluorescent observation in the biotechnology field.

Since the conventional three-dimensional shape measuring apparatuses with an arrayed confocal imaging system have the above-described problems, there is a strong demand for a new three-dimensional shape measuring apparatus with an arrayed confocal imaging system which can solve these problems.

In both the above-described conventional scanning-type and arrayed-type three-dimensional shape measuring apparatuses with the confocal imaging system, the distance between an object and the objective lens must be changed by moving the object stage in the Z direction. Therefore, these apparatuses need a precision moving mechanism for moving the object stage in the Z direction, which makes them complex and large. Further, in the step moving method in which the object stage is moved step by step to acquire a confocal image at each stop position, it takes a very long time to obtain a large number of confocal images while maintaining the required high accuracy of the stop positions. On the other hand, in the continuous moving method in which the object stage is continuously moved to acquire a confocal image at each predetermined position, it is difficult to maintain the required accuracy because the acquisition timing affects the positional accuracy.

Hence, to improve the measuring speed and accuracy of the conventional three-dimensional shape measuring apparatuses, there is a demand for a three-dimensional shape measuring apparatus with a confocal imaging system which has a new means capable of quickly and accurately changing the relative positions between the object and the object-position-in-focus, instead of using an object stage movable in the Z direction.

Finally, although the measuring speed of the three-dimensional shape measuring apparatus using an arrayed confocal imaging system has been remarkably improved as described above, the speed is not yet sufficient for various applications in which a high measuring speed is required. A further improvement in the measuring speed has been difficult because of the following reasons. Readout of the data from the CCD sensor is performed serially, and hence the image data is serially input from the three-dimensional shape measuring apparatus to the image processor which calculates the three-dimensional shape from confocal image data. Each time the data for one pixel is input, the image processor carries out the maximum value detection processing for that pixel to determine confocal image in which the intensity of light of that pixel is maximum. Since the maximum value detection processing is thus carried out for a great number of pixels one by one in turn, processing of one confocal image takes a long time. For example, when the number of the photoelectric elements (pixels) of the CCD sensor used is 500×500, the maximum value detection processing must be repeated 250,000 times for each confocal image. Further, since confocal images are taken in using a desired resolution in height as the interval in the Z direction, acquisition of a large number of confocal images is needed for a predetermined measuring range in the Z direction. For example, when the requested resolution is 1 $\mu$m and the measuring range is 200 $\mu$m, 200 incidents of image acquisition must be performed at a plurality of Z positions, each different from the others by 1 $\mu$m.

Therefore, to further increase the measuring speed of a three-dimensional shape measuring apparatus with an arrayed confocal imaging system, there is a requirement for a three-dimensional shape measuring apparatus with an arrayed confocal imaging system which has an image processor capable of more quickly and precisely calculating the three-dimensional shape of an object from input confocal images.

SUMMARY OF THE INVENTION

The above described problems of the conventional three-dimensional shape measuring apparatus using an arrayed confocal imaging system are solved by the three-dimensional shape measuring apparatus using an arrayed confocal imaging system of the first invention.

The three-dimensional shape measuring apparatus of the first invention has an improved arrayed confocal imaging system.

This arrayed confocal imaging system comprises a light source; a light path diverging optical element which causes the path of illuminating light and the path of reflected light to diverge; a microlenses array provided with a large number of two-dimensionally arranged microlenses each of which converges the illuminating light emitted from the light path diverging optical element into a small spot; a pinhole array provided with a large number of pinholes which are disposed at the focal point of the corresponding microlenses of the microlens array; a telecentric objective lens which converges the illuminating light that passes through the pinholes of the pinhole array toward an object and converges the reflected light from the object toward the pinhole array; a two-dimensional photoelectric sensor which receives the reflected light deflected by the light path diverging optical element and converts the received reflected light into electricity; and an image forming section which is disposed between the light path diverging optical element and the two-dimensional photoelectric sensor and forms an image of the microlenses of the microlens array on the two-dimensional photoelectric sensor.

Since the three-dimensional shape measuring apparatus of the first invention has an improved arrayed confocal imaging system, it has the following advantages. It is easy to manufacture because it has no parts requiring delicate alignment and adjustment. This apparatus therefore can be manufactured using only the assembly and adjustment operations required for ordinary optical systems with no need for special technology or manufacturing facilities. The coefficient of utilization of illuminating light of this arrayed confocal imaging system is very high. Since this imaging system does not use optical elements which require monochromatic light to fulfill their function, white light can be used for illumination, and therefore color observation is possible. Fluorescent observation is also possible by using a dichroic mirror. Furthermore, the problem of interference of reflected light caused by the condition of the surface of an object (e.g. minute unevenness) in three-dimensional shape measurement can also be avoided by use of white light.

The above described problems of the conventional three-dimensional shape measuring apparatus which uses the object stage to change the distance in the Z direction between the object and the object-position-in-focus are solved by the use of the three-dimensional shape measuring apparatus using a confocal imaging system of the second invention.

The three-dimensional shape measuring apparatus of the second invention is provided with refraction means for changing the object-position-in-focus, instead of the object stage being moved in the Z direction, to change the distance between the object and the object-position-in-focus in the Z direction.

One refraction means for changing the object-position-in-focus by comprises a plurality of transparent flat plates for refracting light; a rotary support to which said transparent flat plates are secured; and a driving means for rotating said rotary support. The rotary support is disposed so that when rotated, said transparent flat plates are in turn inserted between the objective lens of said confocal imaging system and the object-position-In-focus.

Another refraction means for changing the object-position-in-focus comprises a transparent flat plate, made of a material for which the refractive index changes according to the voltage applied thereto because of the electrooptic effect, which is disposed between an object and the object-position-in-focus; and a voltage generator for applying a controlled voltage to the transparent flat plate.

Since the three-dimensional shape measuring apparatus of the second invention uses the new refraction means for changing the object-position-in-focus instead of the object stage being moved in the Z direction, the size and configuration become smaller and simpler, and measuring speed and positioning accuracy are greatly increased.

The problem of insufficient measuring speed of the conventional three-dimensional shape measuring apparatus using an arrayed confocal imaging system can be solved by the three-dimensional shape measuring apparatus of the third invention. The three-dimensional shape measuring apparatus of the third invention has an improved image processor.

This image processor estimates the position from which the intensity of reflected light for each pixel of confocal image is maximum, at a higher accuracy than the acquisition interval of confocal images, by interpolation using the following relationship between the intensity of light detected by a confocal imaging system and the distance from the object-position-in-focus to an object point:

Optical intensity=$(|\sin kz(1-\cos \theta)|/kz(1-\cos \theta)|)^2$, wherein k is the wave number of the illuminating light, sin θ is the numerical aperture in the objective lens of the confocal imaging system, and z is a distance from the object-position-in-focus to an object point.

Since the three-dimensional shape measuring apparatus of the third invention has an image processor which estimates the position from which the intensity of reflected light for each pixel of confocal image is maximum at a higher accuracy than the acquisition interval of confocal images by interpolation, the number of confocal images necessary for measurement at a requested resolution in height is considerably reduced, and as a result the measuring speed is greatly increased.

Other objects, features and advantages of the invention will hereinafter become more readily apparent from the following description.

DETAILED DESCRIPTION OF THE INVENTION AND PREFERRED EMBODIMENTS

First, the three-dimensional shape measuring apparatus using an arrayed confocal imaging system of the first invention of this application is explained by way of embodiments.

Figure 5:
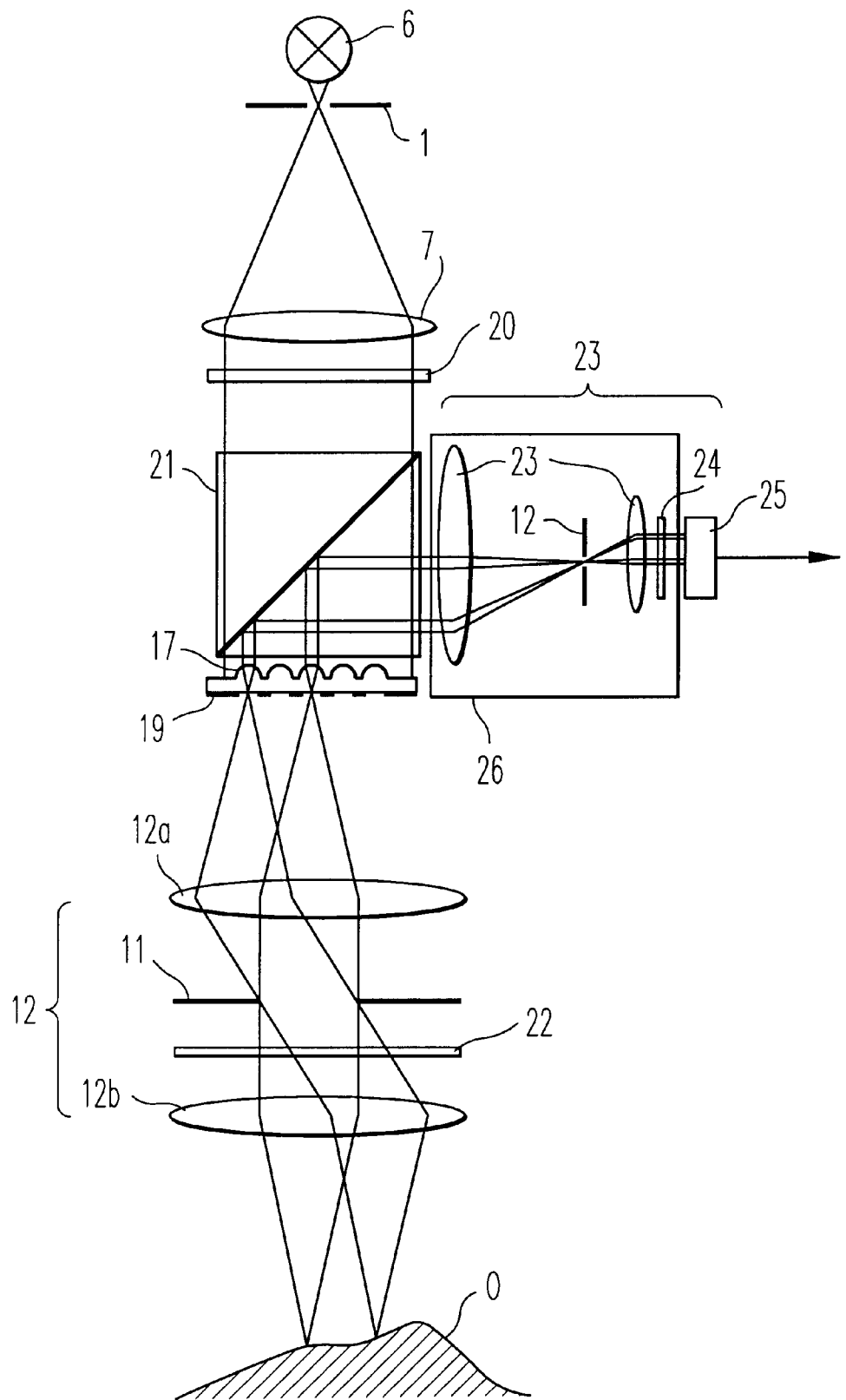
FIG. 5 is a diagram illustrating an embodiment of the three-dimensional shape measuring apparatus using an arrayed confocal imaging system of the first invention of this application.

FIG. 5 shows an embodiment of the three-dimensional shape measuring apparatus using an arrayed confocal imaging system of the first invention of this application. The light emitted from a light source 6 passes through a pinhole 1 to become light from a point light source. The light from the pinhole 1 is refracted into parallel light rays by a collimator lens 7, and then polarized into linearly polarized light by a polarizer 20. The linearly polarized light next enters a light path diverging optical element 21. The light path diverging optical element 21 is a polarized-light beam splitter which allows linearly polarized illuminating light to pass through. The illuminating light which passes through the light path diverging optical element 21 enters the microlenses in a microlens array 17, and is converged at the focal point of the microlenses to pass through the corresponding pinholes of a pinhole array 19. Each pinhole in the pinhole array 19 is positioned at the focal point of the corresponding microlens of the microlens array 17. The illuminating light which passes through the pinholes of the pinhole array 17 enters an objective lens 12. The objective lens 12 consists of two lenses 12a and 12b, a telecentric diaphragm 11 disposed between the lenses 12a and 12b, and a ¼ λ plate 22. The lenses 12a and 12b on each side of the telecentric diaphragm 11 and the telecentric diaphragm 11 make up a telecentric lens which prevents the magnification from being changed if an object O or the imaging system is moved in the direction of the optical axis. The ¼ λ plate 22 is used to polarize the illuminating light into circularly polarized light and reflected light from the object O into linearly polarized light at right angles to the illuminating light. By this configuration, the illuminating light which enters the objective lens 12 is polarized into circularly polarized light by the ¼ λ plate 22 and converged by the lenses 12a and 12b and telecentric diaphragm 11 to form an image of the pinhole array 19 at the position conjugate to the pinhole array 19 without changing the magnification. The reflected light from the object O which enters the objective lens 12 is polarized into linearly polarized light at right angles to the illuminating light by the ¼ λ plate 22, and is converged toward the pinhole array 19 to form the reflecting points of the object and focused on the pinhole array 19. The reflected light which passes through the pinholes of the pinhole array 19 is refracted by the microlenses of the microlens array 17 into parallel light rays. Since the reflected light emitted from the microlens array 17 is linearly polarized at right angles to the illuminating light, it is deflected by the light path diverging optical element 21 and then enters an image forming section 26. The reflected light which enters the image forming section 26 is converged on a two-dimensional photoelectric sensor 25 by an image forming lens 23 consisting of lenses 23a and 23b and a diaphragm 12. Specifically, the image forming lens 23 focuses the reflected light to form an image of the microlens array 17 on the surface of the two-dimensional photoelectric sensor 25. The formed image is a confocal image of the object O. The intensity of light of each pixel of the confocal image is converted by the corresponding photoelectric element of the sensor 25 into a quantity of electricity proportional to the intensity, and output as electric signals. The diaphragm 12 is used to cut stray light, such as the light reflected from the surface of the microlenses, the light scattered by the edge of the pinholes, and the light which cannot pass through a pinhole because of manufacturing error in the microlens, by restricting NA. The function of the low pass filter 24 will be discussed later.

Figure 6:
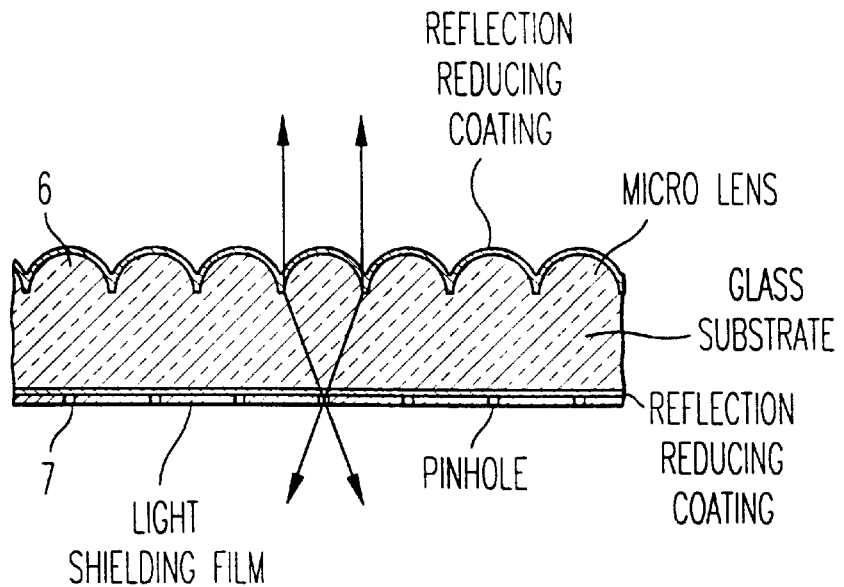
FIG. 6 is an enlarged cross-sectional view of the microlens array and the pinhole array of the embodiment shown in FIG. 5.
Figure 7:
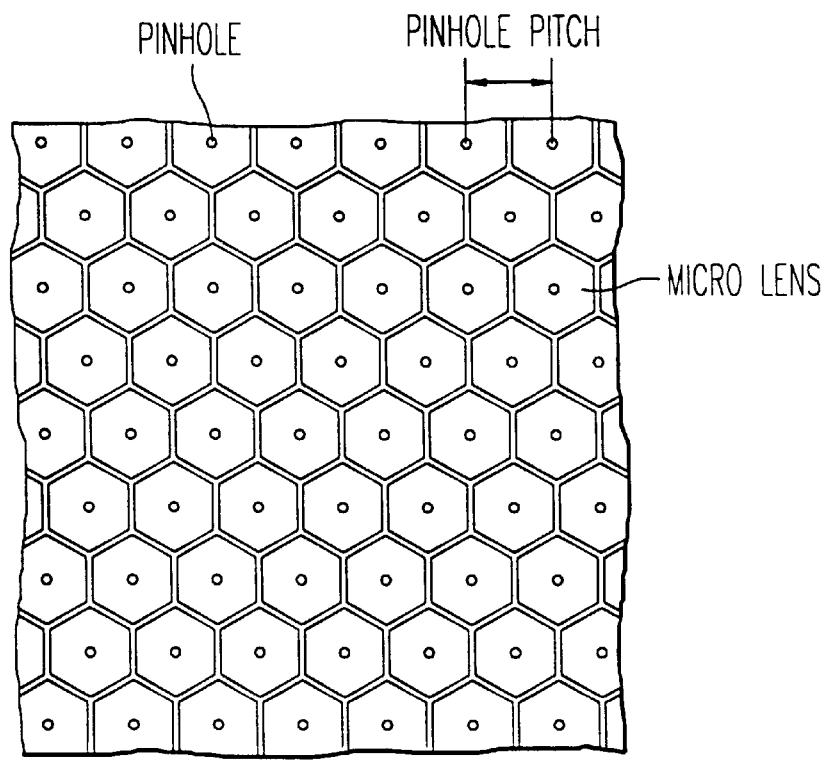
FIG. 7 is an enlarged plan view of the microlens array and the pinhole array of the embodiment shown in FIG. 5.

The configurations of the microlens array 17 and the pinhole array 19 are explained in detail with reference to FIGS. 6 and 7. FIG. 6 is an enlarged cross-sectional view, and FIG. 7 is an enlarged plan view. As shown in FIG. 6, a large number of microlenses are formed on the top surface of a glass substrate, the surface of the microlenses is coated with an anti-reflection film best suited to the illuminating light. A light-shielding film is vapor-deposited over the bottom surface of the glass substrate, and pinholes are formed in the light-shielding film by photolithography. The bottom surface of the glass substrate is also provided with an anti-reflection film, as is the top surface. As shown in FIG. 7, each microlens is hexagonal. Pinholes are formed so as to be positioned coaxially with their corresponding microlenses. Although the microlens array 17 and the pinhole array 19 are integrally formed on the top and bottom surfaces of the glass substrate in this embodiment, these may be formed separately.

Next, the features of the three-dimensional shape measuring apparatus using an arrayed confocal imaging system of the first invention are described and compared with the conventional apparatuses.

In the three-dimensional shape measuring apparatus using an arrayed confocal imaging system of JPA No. 265918/1992 (hereinafter referred to as the conventional apparatus A), the light path diverging optical element (the half mirror 2) is disposed after the pinhole array 8 along the path of the illuminating light. In the apparatus of this invention, on the other hand, the light path diverging optical element 21 is disposed before the pinhole array 19 along the path of the illuminating path. Because of this configuration, the pinholes of the pinhole array 19 of the apparatus of this invention can be used as both the illuminating pinholes and the detecting pinholes, and therefore the precise alignment required for the pinhole array 19 and the CCD sensor 25 of the conventional apparatus A is not required.

Further, since the apparatus of this invention does not always have to use a light path diverging optical element for monochromatic light as required for the reflex hologram 16 of JPA No. 181023/1995 (hereinafter referred to as the conventional apparatus B) and can also use a light path diverging optical element for multicolor light, a white color light source can be used as the light source, and color observation using a white color light source is possible.

The arrayed confocal imaging system of the apparatus of this invention can be designed so that almost all light which enters the microlenses passes through the corresponding pinholes. Hence, a high coefficient of utilization of illuminating light can be obtained.

One reason is that, while the pitch of the pinholes of the pinhole array 19 must be the same as the pitch of the photoelectric elements (pixel pitch) in the CCD sensor of the conventional apparatus A, there is no such restriction on the arrayed confocal imaging system of the apparatus of this invention because the size of the image formed on the photoelectric sensor 25 can be changed freely by the magnification of the image forming lens 23. For example, when the pixel pitch of the photoelectric sensor 25 is 10 $\mu$m and the selected pinhole diameter is ⅕ of the pinhole pitch, the pinhole pitch and pinhole diameter must be 10 $\mu$m and 2 $\mu$m respectively if the magnification of the image forming lens 23 is one. However, if the magnification of the image forming lens 23 is set at ⅕, then the pinhole pitch and pinhole diameter become about 50 $\mu$m and about 10 $\mu$m, and the diameter of the microlenses is then about 50 $\mu$m (the diameter of the microlenses is the same as the pinhole pitch). It is possible to converge the light which enters the microlenses into a 10 $\mu$m spot by microlenses of a diameter of 50 $\mu$m if diffraction is taken into account. Hence, almost all light which enters the microlenses is allowed to pass through the pinholes.

Another reason is that almost all reflected light which passes through the pinholes reaches the sensor 25 in the apparatus of this invention, whereas only the light diffracted by the reflex hologram 16 of the reflected light which passes the pinholes reaches the detector.

For these reasons, the coefficient of utilization of illuminating light of the apparatus of this invention is very high in comparison with that of the conventional apparatus B. That is, the coefficient of utilization of the illuminating light of the apparatus of this invention is 100%, whereas the ratio of the light which can reach the detector array to the light which enters the reflex hologram through the holes in the mask is 24% in the conventional apparatus B (for an assumed diffraction efficiency of the reflex hologram of 40%) when comparing the coefficient of utilization of illuminating light of the apparatus of this invention in case of using laser light (linearly polarized) as the illuminating light and that of the conventional apparatus B which uses laser light, ignoring loss of light at the optical elements and assuming that the surface of the object O is an ideal mirror surface.

The reason for using the hexagonal micro lenses is to fill out the entire surface of the glass substrate with micro lenses, leaving almost no area which is not occupied by a micro lens. In this manner, the light which does not enter micro lenses is minimized and the illumination efficiency is increased. The same effect can be also obtained by square micro lenses. In contrast, circular micro lenses leave a significant glass substrate surface exposed. Because the light which is directed to this exposed part does not pass through the pinholes, the illumination efficiency is low in comparison with the case where hexagonal or square micro lenses are used.

Stray light is a problem which generally arises with the configuration in which a light path diverging optical element is disposed before the pinhole array along the path of the illuminating light as in the arrayed confocal imaging system of the apparatus of this invention. As can be seen in FIG. 5, if illuminating light is reflected by the microlens array 17, the reflected light becomes stray light which reaches the two-dimensional photoelectric sensor 25 causing the image on the sensor 25 to deteriorate. Hexagonal microlenses have also the effect of preventing occurrence of stray light. Since almost all the illuminating light which enters the microlenses passes through the pinholes, reflection, excluding that from the surface of the microlenses, is theoretically zero. The reflection from the surface of the microlenses can be reduced by an anti-reflection film to a level at which it is practically no problem. Square microlenses also have this effect. When there is an exposed glass substrate surface, not filled out by micro lenses, as in the case of circular micro lenses, this exposed area must be masked by light shielding film. However, reflected light from this light shielding film also cause a problem.

Although hexagonal microlenses and square microlenses are theoretically very effective as described above, in practice there is the possibility that the light which enters the microlens does not converge in the corresponding pinholes because of manufacturing error and is reflected by the light-shielding film around the pinholes to become stray light. In addition, there is another possibility that light reflected by the boundary of the microlenses or illuminating light which is deflected by the light path diverging optical element 21 and then reflected in some manner become stray light. Further, this stray light can cause the image on the sensor to deteriorate. Especially, when the reflectance of the object O is small, such stray light cannot be ignored and hence must be removed. As the method of removing stray light, this embodiment polarizes the illuminating light into linearly polarized light by means of the polarizer 20, uses a polarized-light beam splitter as the light path diverging optical element 21, and causes the plane of polarization of the reflected light from the object O to be shifted from that of the illuminating light by 90 degrees by means of the ¼ λ plate 10 as shown in FIG. 5. By this configuration, stray light which occurs before the ¼ λ plate 22 (at the light-source side) is prevented from being deflected by the light path diverging optical element 21 and is also prevented from reaching the two-dimensional photoelectric sensor 25. The polarized-light beam splitter performs the function of an analyzer. The same effect can be obtained by using a separate analyzer. If the reflectance of the object O is sufficiently large, such measures against stray light are not required. Specifically, the polarizer 20 and the ¼ λ plate 22 are not necessary, and the light path diverging optical element 21 may be a non-polarized-light beam splitter.

Figure 8:
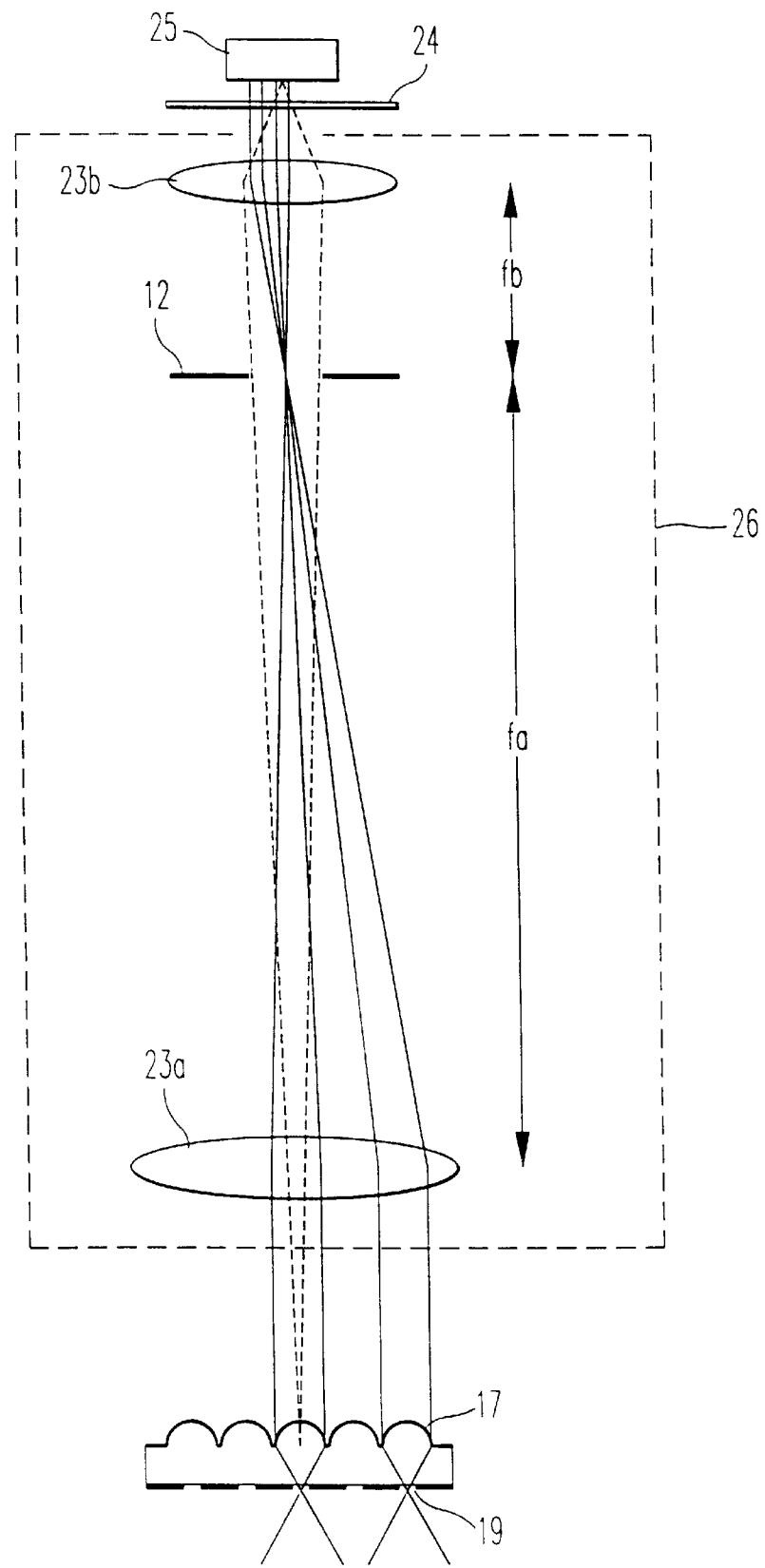
FIG. 8 is an enlarged diagram of the image forming section in the embodiment shown in FIG. 5.

Next, the image forming section 26 is described in detail with reference to FIG. 8. In FIG. 8, 90-degree deflection by the light path diverging optical element 21 is shown by the optically equivalent straight distance. fa indicates the focal length of the lens 23a and fb the focal length of the lens 23b. In this optical system, the surface of the microlens array 17 and the sensing surface of the two-dimensional photoelectric sensor 25 are conjugate to each other. The reflected light from the object O which is emitted from the microlenses contains only parallel light rays if the pinholes are ideal points, but light rays oblique to the optical axis exist because the actual pinholes have an area. Light rays diffracted by the aperture of the microlenses also exist, and these diffracted light rays are also oblique to the optical axis. The image forming lens 26 forms an image of the microlens array 17 on the sensing surface of the two-dimensional photoelectric sensor 25 by converging all these light rays. The diaphragm 12 appropriately restricts these light rays oblique to the optical axis. If the aperture of the diaphragm 12 is too small, diffracted light rays cannot pass through the diaphragm and only the parallel-ray component of the light which comes out from the microlenses reaches the two-dimensional photoelectric sensor 25, causing a decrease in resolution. If the aperture of the diaphragm 12 is too large, light rays oblique to the optical axis including those at excessively large angles reach the sensor 25. Since the light rays oblique to the optical axis at large angles are stray light in all cases, this also causes the image formed on the sensor 25 to deteriorate.

Figure 1:
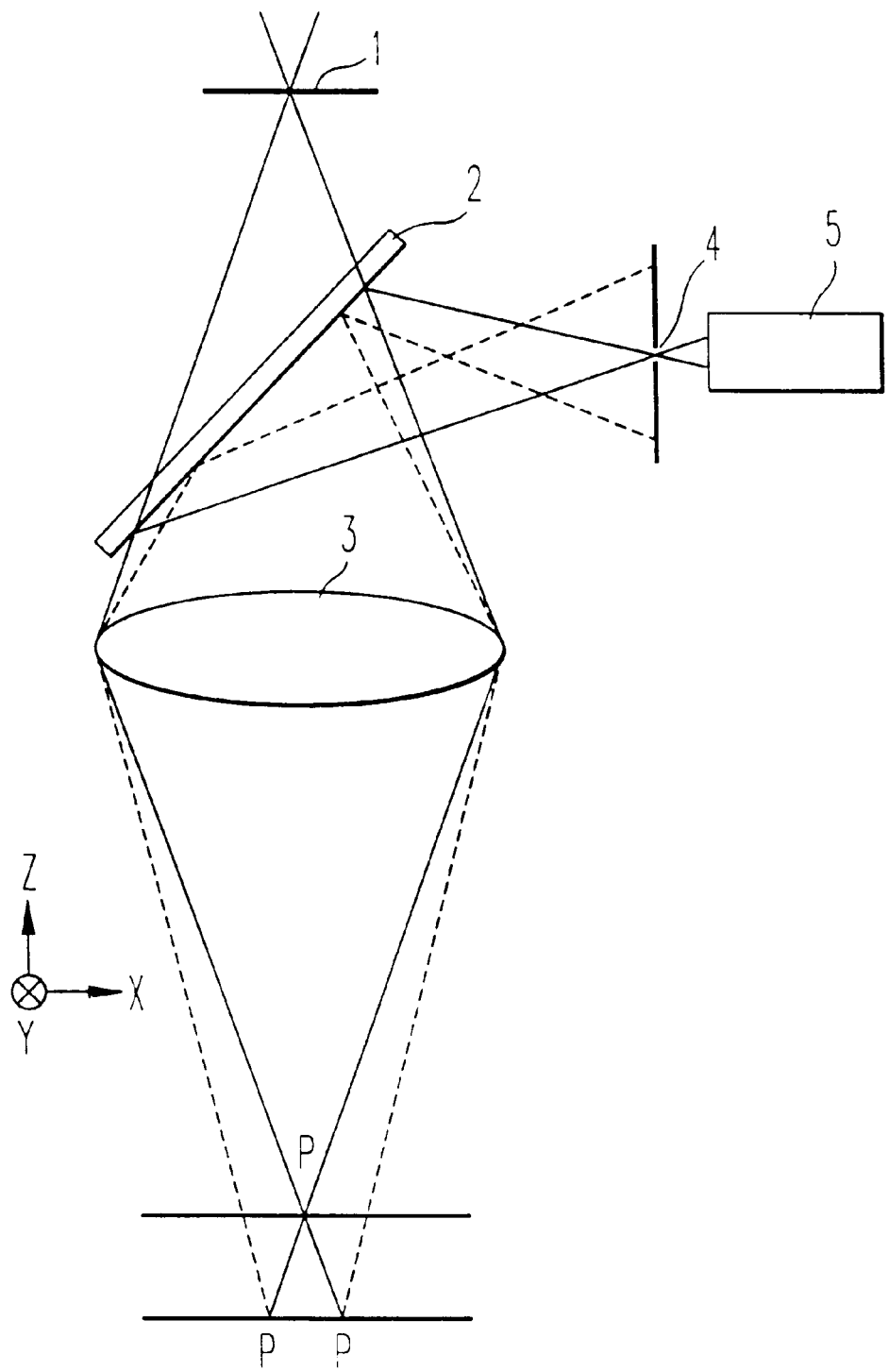
FIG. 1 is a diagram illustrating a basic configuration of a confocal optical imaging system.
Figure 2:
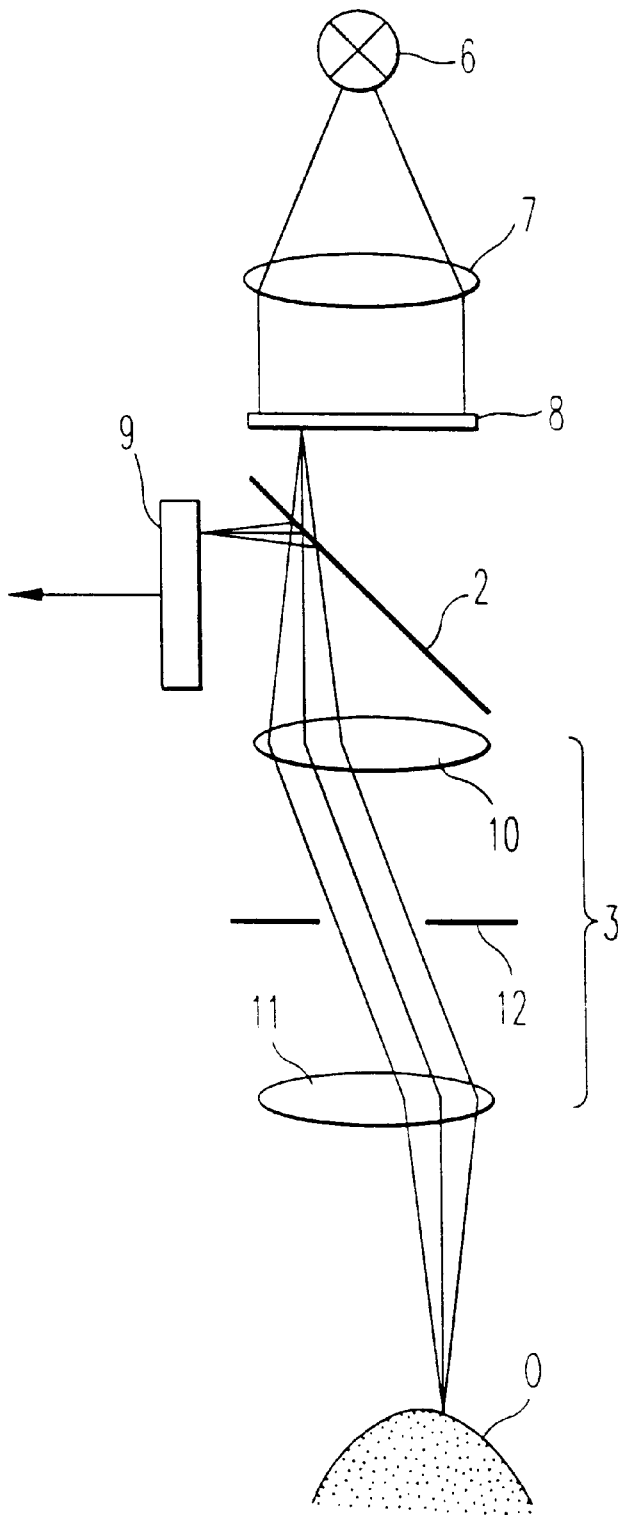
FIG. 2 is a diagram showing the apparatus disclosed by JPA No. 265918/1992.
Figure 3:
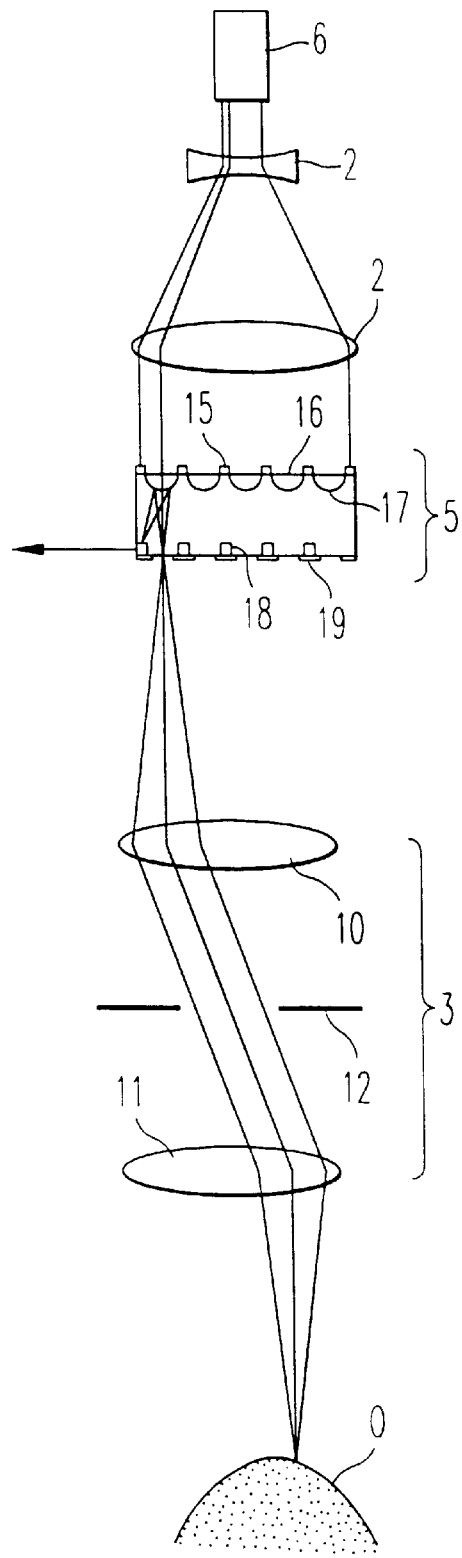
FIG. 3 is a diagram showing the apparatus disclosed by JPA No. 181023/1995.
Figure 4:
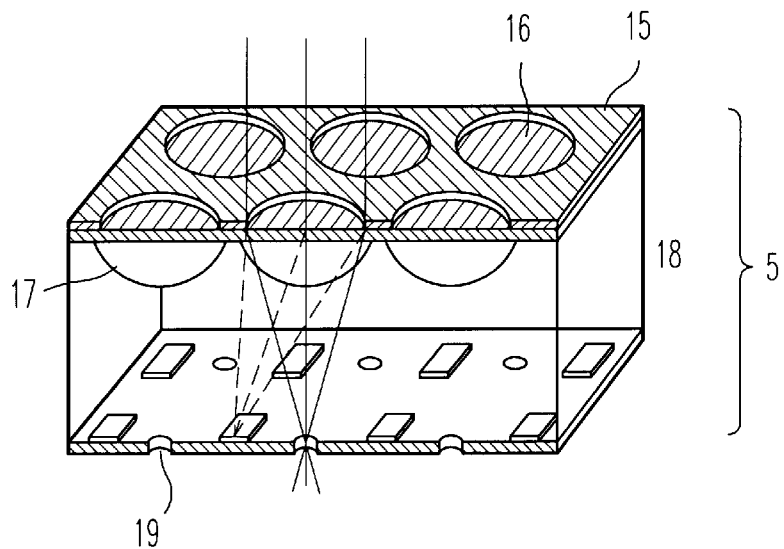
FIG. 4 is an enlarged diagram of the illuminating and detecting section of the apparatus of JPA No. 181023/1995 shown in FIG. 3.
Figure 9:
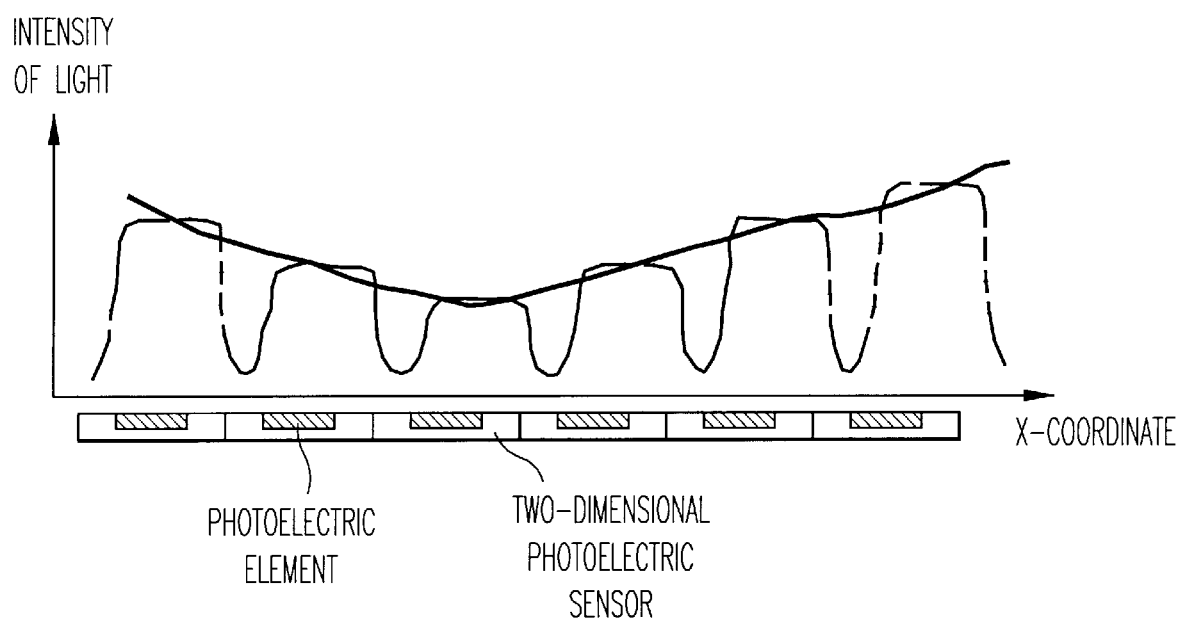
FIG. 9 is a diagram showing the distribution of the intensity of light of the image of the microlens array formed on the two-dimensional photoelectric sensor.

FIG. 9 shows the distribution of the intensity of light of the image of the microlens array 17 formed on the two-dimensional photoelectric sensor 25. The broken line indicates the distribution of the intensity of light when the low-pass filter 24 is not used. For the distribution indicated by the broken line, precise alignment of the images of the microlenses (crests of the graph) and the photoelectric elements of the sensor 25 is required. If these are not properly aligned, correct image data cannot be obtained because of aliasing. To make this precise alignment unnecessary, the light is allowed to pass through a low-pass filter 24. By allowing the light to pass through the low-pass filter 24, the bandwidth of spatial frequencies of the image is limited, and the distribution of the intensity of light of the image becomes a smooth curve as indicated by the solid line in FIG. 9. As a result, precise alignment of the images of the microlenses and the photoelectric elements of the sensor 25 becomes unnecessary. This limitation of bandwidth cuts the spatial frequencies greater than ½ of the spatial frequency of the disposition of the photoelectric elements of the sensor 25 according to the sampling theorem. Although the low-pass filter 24 is used to limit the bandwidth of spatial frequencies of the image formed on the sensor 25, it is possible to design the system so that the MTF of the image forming lens 23 itself satisfies the condition for the limitation of bandwidth or to decrease the NA of the image forming optical system 26 by narrowing the diaphragm 12, instead of using the low-pass filter 24.

Figure 10:
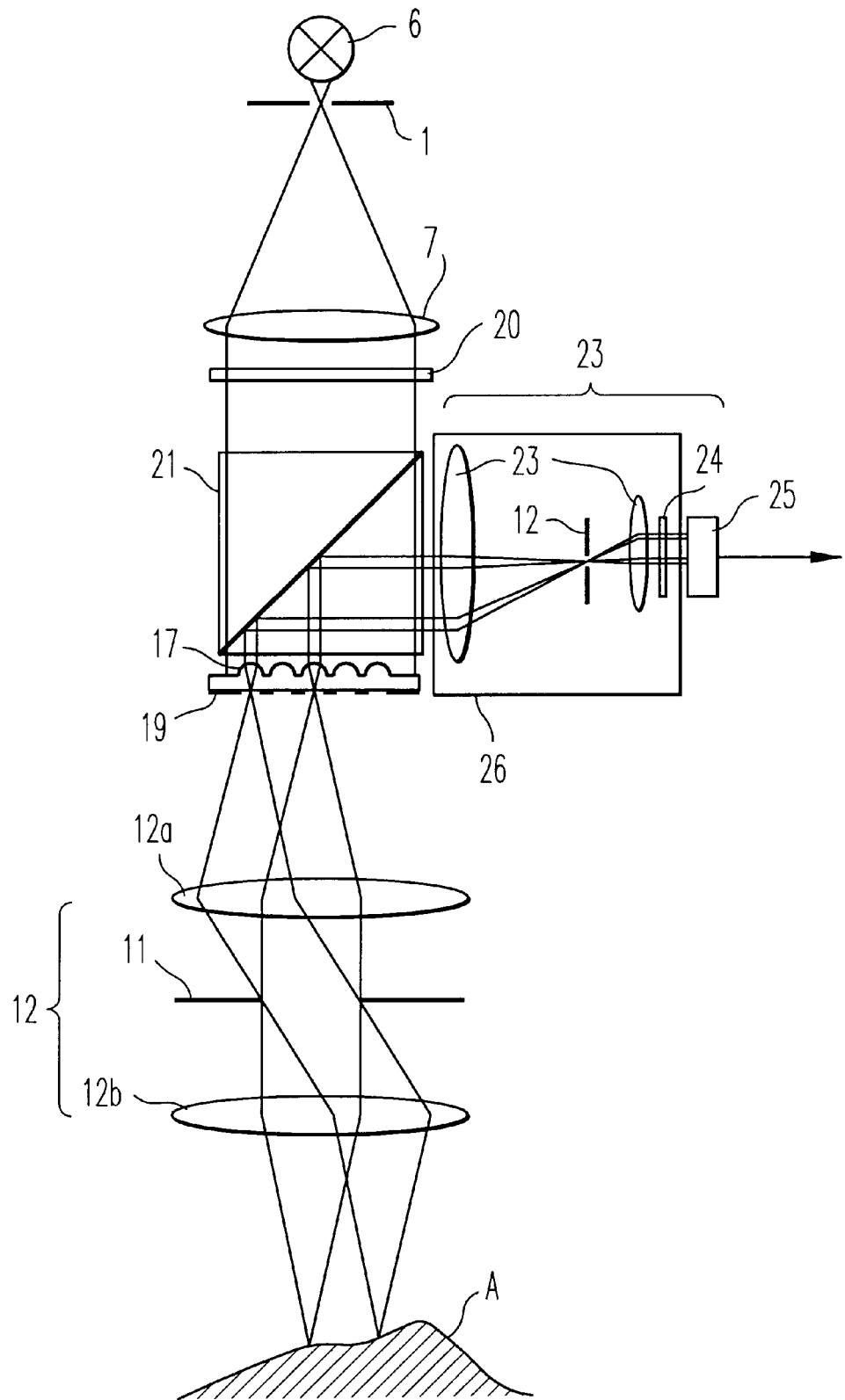
FIG. 10 is a diagram illustrating another embodiment of the three-dimensional shape measuring apparatus using an arrayed confocal imaging system of the first invention of this application.

FIG. 10 shows another embodiment of the three-dimensional shape measuring apparatus using an arrayed confocal imaging system of the first invention. This embodiment differs from the above embodiment in that the light source 6 is a mercury lamp, that polarizing elements (polarizer 20 and ¼ λ plate 22) are not used, and that the light path diverging optical element 21 is a dichroic mirror. The rest of the configuration is the same as that of the above embodiment. The dichroic mirror used as the light path diverging optical element 21 transmits ultraviolet light used as the illuminating light and reflects fluorescent light from an object O to deflect toward the image forming optical system 26. By this configuration, fluorescent observation of an object O is made possible.

It should be understood that the configurations of the arrayed confocal imaging system of the above embodiments are typical examples and various modifications are possible. For example, the microlens array 17 and the pinhole array 19 may be formed on separate glass substrates. The substrate need not be a glass substrate, but may be of other materials such as an optical resin. The shape of the microlenses must not be hexagon or rectangular, but may be circular, triangular, or another shape. Moreover, the position of the illuminating optical system and the image forming optical system divided by the light path diverging optical element 21 may be reversed as necessary. Furthermore, the illuminating light is not limited to white light. Laser light may be used.

The arrayed confocal imaging system for the three-dimensional shape measuring apparatus of the first invention of this application is easy to manufacture because it has no parts requiring delicate alignment and adjustment and hence can be manufactured only by assembly and adjustment of ordinary optical systems without requiring a special technology or manufacturing facilities. The coefficient of utilization of the illuminating light of this arrayed confocal imaging system is very high. Since this imaging system does not use optical elements for which monochromatic light must be used to fulfill their function, white light can be used for illumination, and therefore a color observation is possible. Fluorescent observation is also possible by using a dichroic mirror. Furthermore, the problem of interference of reflected light caused by the condition of the surface of an object (e.g. minute unevenness) in three-dimensional shape measurement can also be avoided by use of white light.

Next, the three-dimensional shape measuring apparatus using a confocal imaging system of the second invention of this application is described by way of embodiments.

Figure 11:
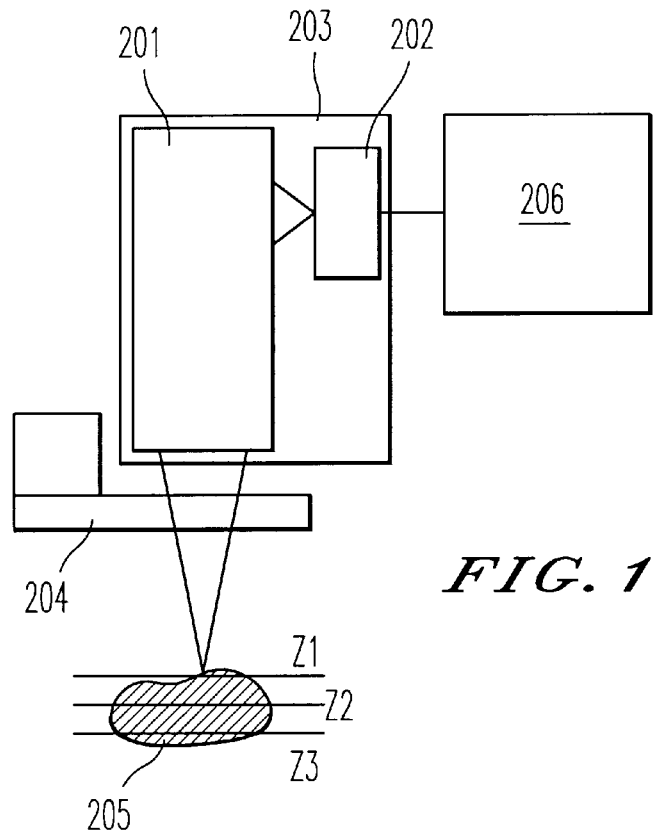
FIG. 11 is a diagram showing an embodiment of the three-dimensional shape measuring apparatus using a confocal imaging system of the second invention of this application.
Figure 12:
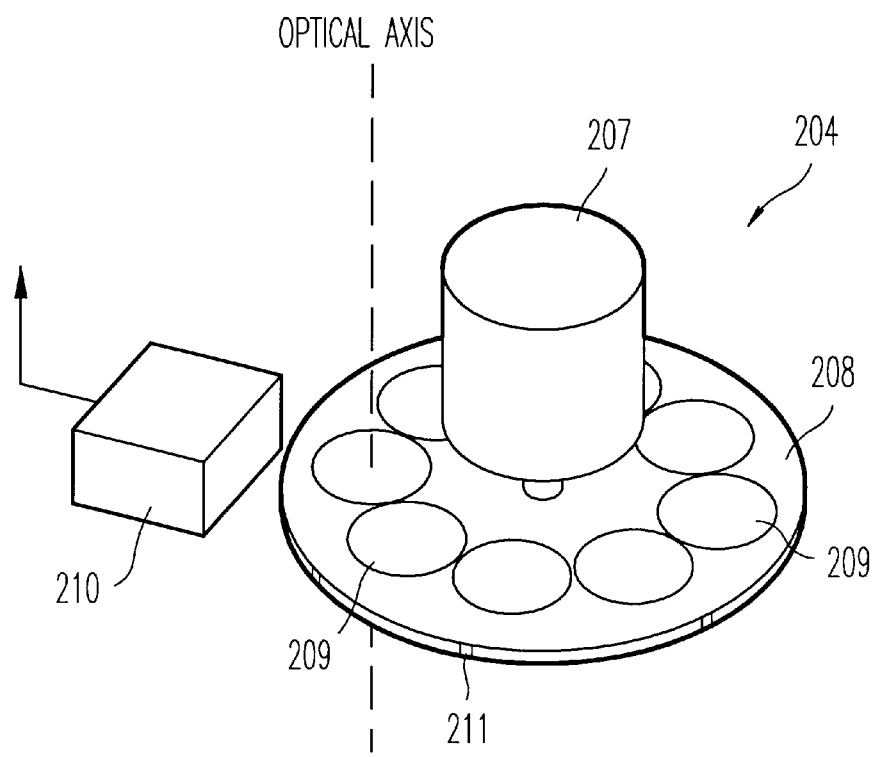
FIG. 12 is a diagram showing an embodiment of the means for changing the object-position-in-focus by refraction.

FIG. 11 is a diagram which shows an embodiment of the three-dimensional shape measuring apparatus using a confocal imaging system of the second invention. A confocal optical system indicated by numeral 201 may be either the above-described scanning confocal optical system or an arrayed confocal optical system. A photoelectric sensor 202 converts a two-dimensional image produced by the confocal optical system 201 into electric signals. The output signal of the photoelectric sensor 202 is input to an image processing apparatus 206. The confocal optical system 201 and the photoelectric sensor 202 make up a confocal imaging system 203 which generates image signals. A refraction means 204 for changing the object-position-in-focus changes the relative position between the object and the object-position-in-focus in the Z direction, or the position of an object point so that the intensity of the reflected light detected by the confocal imaging system 203 becomes maximum. An embodiment of the refraction means 204 for changing the object-position-in-focus is shown in FIG. 12. The refraction means 204 for changing the object-position-in-focus of this embodiment comprises a motor 207, a rotary support 208 positioned on the output axis of the motor 207, and a plurality of transparent flat plates 209 which have the same refractive index and different thicknesses and are secured to a rotary support 208 which is disposed around the center of the rotary support 208. A sensor 210 is disposed near the circumferential surface of the rotary support 208. Marks 211, which can be detected by the sensor 210, are attached to the circumferential surface of the rotary support 208 at the positions where the radius passing through the center of each transparent flat plate 209 crosses the circumferential surface. The marks 211 are detected by a sensor 110 when they pass the sensor 110.

This refraction means 204 for changing the object-position-in-focus is disposed so that when the rotary support 208 is rotated, the transparent flat plates 209 are in turn inserted between the objective lens of the confocal imaging system 203 and the object-position-in-focus (the same position as the converging position of the illuminating light) perpendicularly to the optical axis of the object lens. When a transparent flat plate 209 is inserted between the objective lens of the confocal imaging system 203 and the object-position-in-focus, the object-position-in-focus shifts in the Z direction by a small distance according to the thickness of the transparent flat plate 209 as shown by z1, z2, and z3. Accordingly the relative distance in the Z direction between the object and the object-position-in-focus changes. The thicknesses of the transparent flat plates 209 are determined so that they change gradually one from another by the thickness which shifts the object-position-in-focus by the sampling distance in the Z direction. Therefore, insertion of the transparent flat plates 209 in order between the objective lens and the object-position-in-focus causes a step move of a predetermined distance of the object-position-in-focus. Further, a confocal image can be acquired at the instant when the transparent flat plate 209 is inserted at the correct position while rotating the rotary support 208 at a high speed by synchronizing the rotation of the rotary support 208 with acquisition of a confocal image of the confocal imaging system 203 by using the detection signal obtained from the sensor 210 when the sensor 210 detects a mark 211 attached to the rotary support 208. This makes it possible to acquire confocal images, changing the distance between the object and the object-position-in-focus by the step distance at the full speed of the confocal imaging system 203 without restriction, by changing the distance between the object and the object-position-in-focus. Since deviation of a transparent flat plate 209 from the correct position in the Z direction and in the direction of rotation does not affect the shifted position of the object-position-in-focus, repetition accuracy of the positions at which confocal images are acquired is greatly improved.

The transparent flat plates 209 may be formed of an optical glass, optical resin or optical crystal, or may be fabricated by sealing a liquid or a liquid crystal in containers made of an optical glass, an optical resin or an optical crystal.

Although the transparent flat plates used in this embodiment are made of the same material and have different thicknesses, those which are made of materials with different refractive indices and have the same thickness or those which are made of materials with different refractive indices and have different thicknesses may also be used.

Further, although the rotary support 208 used in this embodiment is a circular plate, it may be a polygon plate, or a conical or cylindrical surface.

Furthermore, one refraction means 204 for changing the object-position-in-focus is used in this embodiment, but two or more may be used to utilize their transparent flat plates 209 in combination. By this configuration, a large number of step moves of the object-position-in-focus become possible.

Figure 13:
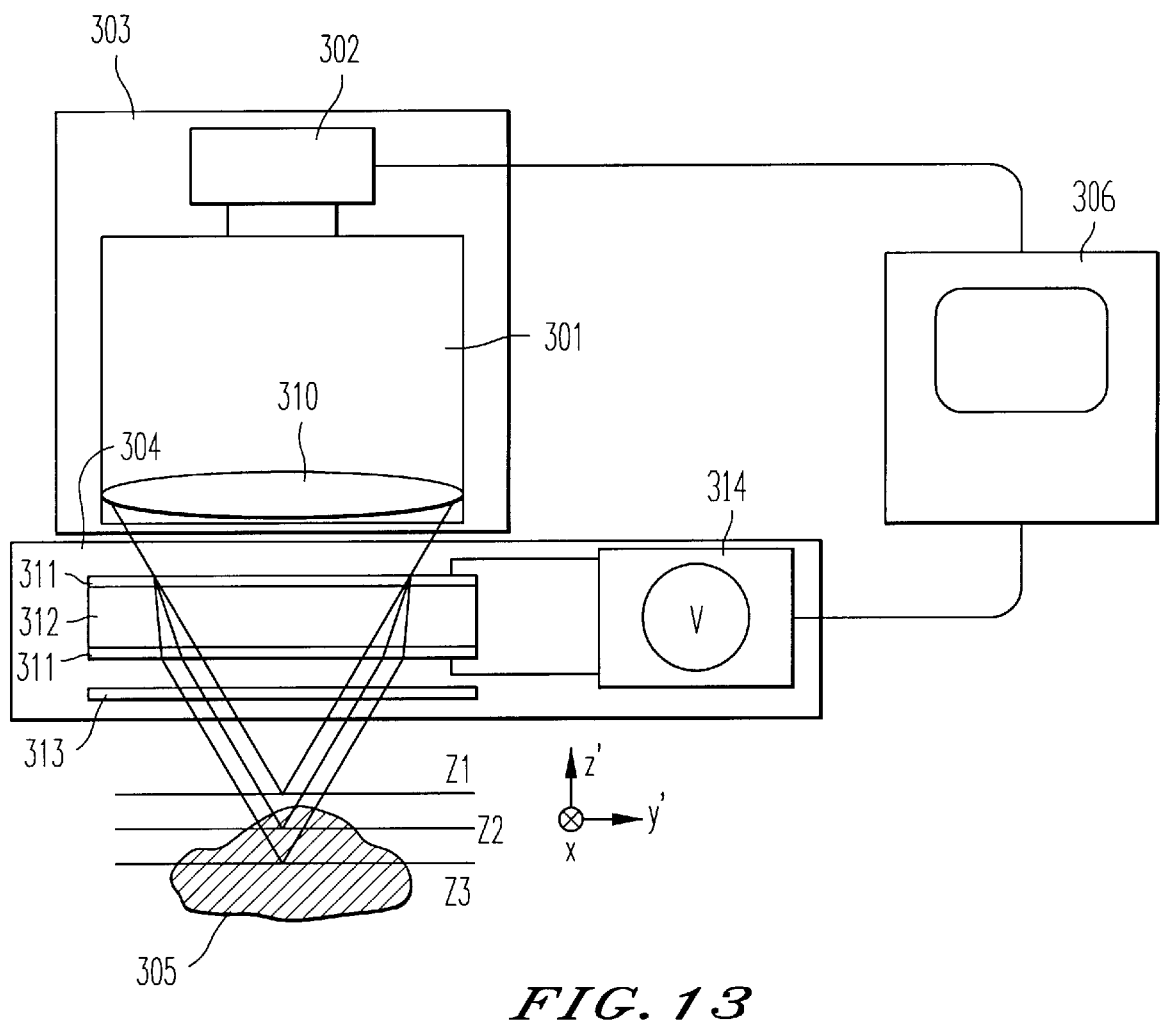
FIG. 13 is a diagram showing another embodiment of the three-dimensional shape measuring apparatus using a confocal imaging system of the second invention of this application.

FIG. 13 is a diagram which shows another embodiment of the three-dimensional shape measuring apparatus using a confocal imaging system of the second invention. A confocal optical system indicated by numeral 301 may be either the above-described scanning confocal optical system or an arrayed confocal optical system. A photoelectric sensor 302 converts a two-dimensional image produced by the confocal optical system 301 into electric signals. The output signal of the photoelectric sensor 302 is input to an image processing apparatus 306. The confocal optical system 301 and the photoelectric sensor 302 make up a confocal imaging system 303 which generates image signals. A refraction means 304 for changing the object-position-in-focus changes the relative position between the object and the object-position-in-focus in the Z direction, or the position of an object point so that the intensity of the reflected light detected by the confocal imaging system 203 becomes maximum.

Figure 14:
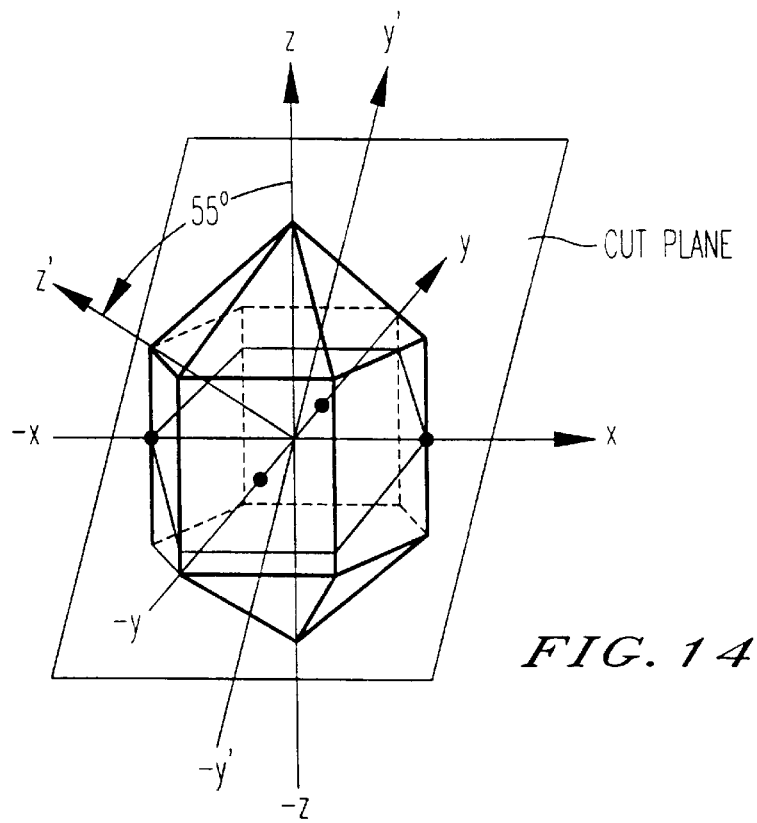
FIG. 14 is a diagram showing an LN crystal.

Next, the refraction means 304 for changing the object-position-in-focus used in this embodiment is described below. In this embodiment, lithium niobate (LiNbO$_3$, hereinafter abbreviated to LN) crystals are used for the transparent flat plate 312 to change the refractive index. An LN crystal is known to exhibit a primary electrooptic effect (Pockels effect). An optically homogenous large-area LN crystal can be obtained. The LN crystal is a uniaxial crystal with a hexagonal external shape in a plane vertical to the optical axis (z axis). The direction of a line joining two opposite vertices of the hexagon is here taken as the x axis. A flat slice cut from a LN crystal in the direction at 55β from the z axis toward the -y axis is used for this embodiment. As shown in FIG. 14, the direction vertical to the cutting plane is taken as the z' axis, and the direction parallel to the cutting plane is taken as the y' axis. A slice cut in this manner is widely used as an optical modulator because when it is used as a longitudinal type optical modulator (when voltage is applied in the z' direction and light is introduced in parallel to the voltage) the change in the difference of phase between light with an electric-field vector in the x direction and that with an electric-field vector in the y' direction caused by the applied voltage is large. Hence, the half-wave voltage (voltage such that the phase difference becomes a half-wave angle) is the smallest. This is basically the same with a slice with another angle. As shown in FIG. 13, a polarizer 313 polarizes incident light into linearly polarized light parallel to the y' axis. The transparent flat plate 312 is a slice of an LN crystal cut at 55β. z', y' and x in FIG. 13 indicate the same crystal orientations as in FIG. 14. The transparent flat plates 312 is provided with electrodes (ITO membranes) 311 on the top and bottom sides. When a voltage is applied by a voltage generator 314 between the electrodes (the z' direction), the refractive index for light which has electric-field vector components in the y' and x direction and advances in the z' direction changes according to the voltage applied. Reflected light from an object 305 passes through the polarizer 313 to become only linearly polarized light parallel to the y' axis, and then enters the transparent flat plate 312. The light is refracted again by the transparent flat plate 312 according to the voltage applied, and then enters the confocal optical system. By this configuration, the object-position-in-focus shifts according to the change in the refractive index in the y' direction of the transparent flat plate 12. Therefore the object-position-in-focus can be controlled electrically.

Although the LN crystal is used as the material for the refraction 204 means for changing the object-position-in-focus, any material which can exhibit the electrooptic effect can be used. There are many crystals which exhibit the electrooptic effect, such as $Bi_{12}SiO_2O$ (BSO) crystals and $Bi_{12}GeO_2O$ (BGO) crystal. Translucent ceramics such as (Pb,La)(Zr,Ti)O$_3$ (PLZT) can also be used. Moreover, since liquid crystals also exhibit the electrooptic effect, they can also be used.

By using the refraction means for changing the object-position-in-focus as described above, the three-dimensional shape measuring apparatus using a confocal imaging system becomes smaller in size, simpler in configuration, and much higher in measuring speed compared to the conventional apparatuses which use an object stage movable in the Z direction.

Next, an embodiment of the three-dimensional shape measuring apparatus using a confocal imaging system of the third invention of this application is described below.

Figure 15:
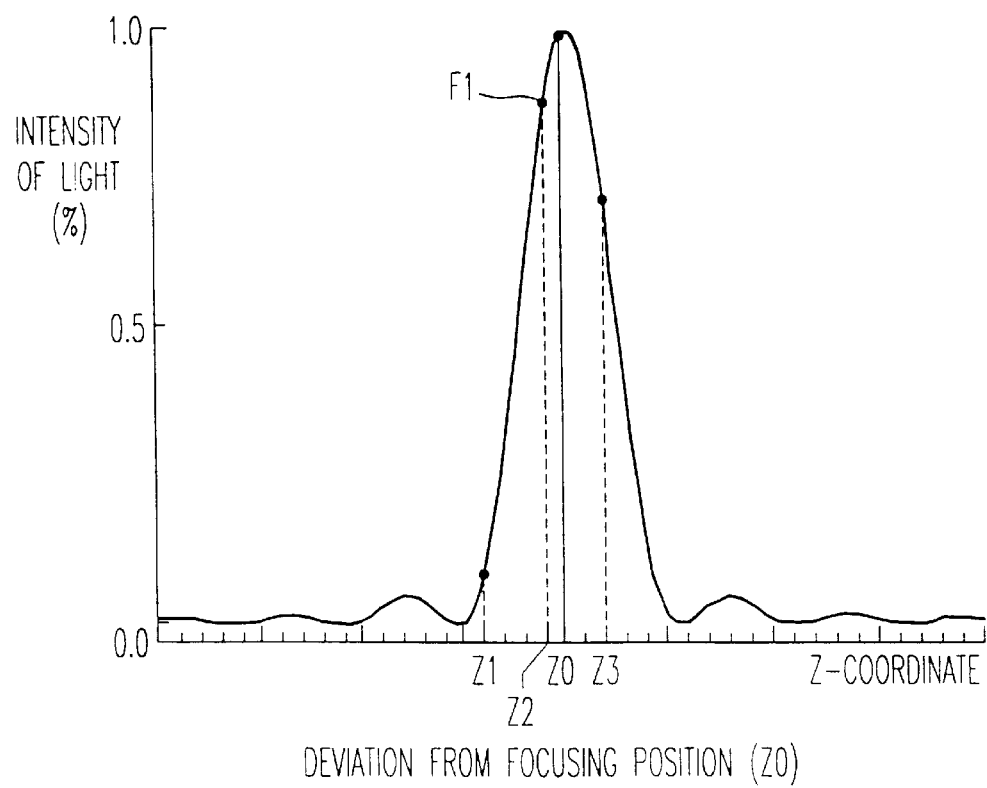
FIG. 15 is a graph showing the intensity of light detected by a confocal imaging system versus the distance from the object-position-in-focus to the object point which reflects the light.

It is known that the relationship between the intensity of light detected by a confocal imaging system and the distance from the object-position-in-focus to an object point is given by the following formula;

Optical intensity=$(|\sin kz(1-\cos \theta)|/|kz(1-\cos \theta)|)^2$ wherein k is the wave number of the illuminating light, sin θ is the numerical aperture in the objective lens of the confocal imaging system, and z is the distance from the object-position-in-focus to an object point (e.g. T. R. Corle et al. "Depth response of confocal optical microscopes", OPTICS LETTERS, Vol. 11, No. 12, 1986). FIG. 15 shows this relationship in the case where the wavelength of the illuminating light is 550 nm and the numerical aperture in the objective lens is 0.1, as an example. In this example, the width of the center lobe is about 100 μm. The three-dimensional shape measuring apparatus of the third invention acquires confocal images at 50 μm intervals in the Z direction so that at least two sampling positions fall within the width of the center lobe for this example.

Specifically, eleven confocal images are acquired at 50 μm intervals by the object stage moved in the Z direction or by the refraction means for changing the object-position-in-focus described above. If the intensity of light at the same pixel positions of the thus-obtained confocal images is plotted on the Z values, the dots indicate the values to be obtained from the similar continuous graph as shown in FIG. 15 by sampling at the positions where the confocal images are acquired. An example of this sampling is shown by the broken line in FIG. 15. Since the relationship between the intensity of light and the distance from the object-position-in-focus to an object point is accurately given by the above theoretical formula, the Z value of the peak of the center lobe (hereinafter referred to as the peak position) can be estimated to a higher accuracy than the sampling interval of confocal images by interpolation from discrete information. For example, the peak position can be analytically calculated by using the Gaussian curve closely resembling the shape of the center lobe. Specifically, the peak position p is calculated from the values of two points, that is, the largest value v1 among the sampled values (the values of the pixel under consideration of the confocal images obtained), and the value v2 at the position either before or after the position p1 of the largest value v1 by the following equation:

$P = p1 + (1 + a^2(\log v2 - \log v1))/2,$ wherein v1 is the largest value among the values of the pixel under consideration for the confocal images obtained, v2 is the value at the position after the position p1 under the largest value v1, a is the parameter indicating the width of the center lobe and a constant determined by the wavelength of the illuminating light and the numerical apertures of the objective lens of the confocal imaging system, and p is the position at which said curve becomes maximum. There is another method of calculating the peak position by using three or more values. When using this method, the interval of sampling must be smaller so that at least three sampling points fall within the center lobe. The interpolation can also be performed by using other functions resembling the shape of the center lobe such as a quadratic function, instead of Gaussian curve. It is also possible to use the model formula directly. Calculations which use a moment are also possible. To increase the speed of the above processing, it is also possible to store the results of the processing in an LUT beforehand and refer to the stored results as necessary.

The three-dimensional shape of an object can be measured by performing the above-described processing on all pixels of the confocal images obtained.

The image processor which calculates the height of an object by the above processing is expected to increase the resolution up to about 1/20 of the sampling interval of the confocal images. Therefore, the attained resolution is 2.5 μm in the above example. To measure three-dimensional shapes at the same resolution, a conventional apparatus must acquire 201 confocal images at 2.5 μm intervals and perform the image processing on the large number of confocal images, taking a very long time for acquisition of confocal images. Since the three-dimensional shape measuring apparatus of this third invention using the above image processor must acquire only 11 confocal images at 50 μm intervals as described above, the measuring speed is greatly increased.

The three-dimensional shape measuring apparatus of this third invention thus makes it possible to acquire confocal images at intervals much larger than the required resolution in the Z direction and still obtain the required resolution. For this apparatus, it is desirable to accurately change the relative distance in the Z direction between the object and the object-position-in-focus intermittently by the interval of sampling, instead of changing the distance continuously as by moving the object stage.

Having illustrated and described the principles of my inventions in preferred embodiments thereof, it should be readily apparent to those skilled in the art that the inventions can be modified in arrangement and detail without departing from such principles. I claim all modifications coming within the sprit and scope of the accompanying claims.

What is claimed is:

1. A three-dimensional shape measuring apparatus using a confocal imaging system comprising:

a confocal imaging system which comprises a scanning confocal optical system that scans an object with one or more confocal optical systems mechanically or optically to obtain a confocal image, or an arrayed confocal optical system consisting of a plurality of two-dimensionally arrayed confocal optical systems, and a two-dimensional photoelectric sensor for converting a two-dimensional image formed thereon by the confocal optical system into electricity;

means for changing the relative distance in a Z direction between an object and an object-position-in-focus; and an image processor which calculates a three-dimensional shape of the object from confocal images acquired at different relative distances in the Z direction between the object and the object-position-in-focus by the arrayed confocal imaging system and the means for changing the relative distance in the Z direction between an object and the object-position-in-focus;

wherein said means for changing the relative distance in the Z direction between an object and the object-position-in-focus comprises:

a plurality of transparent flat plates which are made of a material with the same refractive index and different thicknesses, transparent flat plates which are made of materials with different refractive indices and the same thickness, or transparent flat plates which are made of materials with different refractive indices and have different thicknesses;

a rotary support to which said transparent flat plates are secured; and a drive means for rotating said rotary support; and is disposed so that when said rotary support is rotated, said transparent flat plates are in turn inserted between the objective lens of said confocal imaging system and the object-position-in-focus.

2. The three-dimensional shape measuring apparatus using a confocal imaging system of claim 1 wherein said rotary support is a circular or hexagonal flat plate.

3. The three-dimensional shape measuring apparatus using a confocal imaging system of claim 1 wherein said rotary support has a conical or cylindrical surface, and said transparent flat plates are secured to the conical or cylindrical surface.

4. The three-dimensional shape measuring apparatus using a confocal imaging system of claim 1 wherein said means for changing the relative distance in the Z direction between an object and the object-position-in-focus further comprises a sensor disposed near said rotary support, and said rotary support is provided with one or more marks capable of being detected by the sensor.

* * * * *